United States Patent
Hartless et al.

(10) Patent No.: US 6,292,660 B1
(45) Date of Patent: Sep. 18, 2001

(54) ADAPTIVE SITE SCANNING BASED ON FADE BASE ESTIMATION

(75) Inventors: Mac Hartless, Forest; William O. Janky, Goode, both of VA (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/162,589

(22) Filed: Sep. 29, 1998

(51) Int. Cl.⁷ .................................................... H04Q 7/20
(52) U.S. Cl. .................... 455/434; 455/32.1; 455/455; 455/515
(58) Field of Search .................... 455/434, 435, 455/450, 455, 458, 161.1–161.3, 277.1, 33.2, 52.1, 135, 133–136, 140, 31.3, 67.1, 144, 414, 441, 504, 63, 33.4, 67.3, 432, 38.1, 506, 68, 226.4; 370/260, 261, 263; 379/202, 205, 206

(56) References Cited

U.S. PATENT DOCUMENTS

| | | | |
|---|---|---|---|
| 5,396,645 | * 3/1995 | Huff | 455/33.4 |
| 5,491,837 | * 2/1996 | Haartsen | 455/62 |
| 5,634,206 | * 5/1997 | Reed et al. | 455/277.1 |
| 5,726,978 | * 3/1998 | Frodigh et al. | 370/252 |
| 5,774,807 | * 6/1998 | Yazaki et al. | 455/434 |
| 5,784,363 | * 6/1998 | Engstrom et al. | 370/332 |
| 5,903,838 | * 5/1999 | Yazaki et al. | 455/434 |
| 5,905,945 | * 5/1999 | Hill et al. | 455/31.3 |

FOREIGN PATENT DOCUMENTS

| | | | |
|---|---|---|---|
| 0419205A2 | 3/1991 | (EP) | H04Q/7/04 |
| 0714217A2 | 5/1996 | (EP) | H04Q/7/32 |
| 2305925A | 4/1997 | (GB) | H04Q/7/38 |

\* cited by examiner

*Primary Examiner*—Thanh Cong Le
*Assistant Examiner*—Pablo Tran
(74) *Attorney, Agent, or Firm*—Myers Bigel Sibley & Sajovec

(57) ABSTRACT

Methods and systems for controlling site scanning of a wireless device by adjusting the rate at which the wireless device site scans based on whether the wireless device is in motion. Furthermore, this determination may be made by determining a fade rate and then basing the rate of site scanning on this determined fade rate. Preferably, the rate at which the wireless device site scans proportionally to the fade rate. Multiple thresholds of fade rate may be used to adjust the site scanning rate to provided multiple site scanning rates.

14 Claims, 6 Drawing Sheets

ADAPTIVE SITE SCANNING BASED ON FADE BASE ESTIMATION

FIELD OF THE INVENTION

The invention relates to wireless communications and, more particularly, to site scanning in wireless communications.

BACKGROUND OF THE INVENTION

Communication networks typically include at least one sender and one receiver. In either a wired or wireless network, a signal transmitted between the sender and receiver must be of sufficient magnitude (or strength) to allow the information contained within the signal to be discriminated from the noise which is generally present in the communication network. This may be a greater problem with a wireless network and mobile terminals, which typically are more susceptible to noise and multi-path fading effects.

An example of a wireless network is a radio network such as a cellular network commonly utilized for voice and/or data communications between a fixed base station covering a geographic region and mobile devices such as cellular telephones or private radios present in the covered region. A cellular telephone typically includes a radio receiver including an antenna for receiving signals and an amplifier/detector for generating a measure of the strength of received signals or noise. A signal strength measure, commonly known as Received Signal Strength Indication (RSSI), may be expressed as a logarithmic measure of received signal strength and may be converted to a digital form by an analog to digital converter.

It is known in the prior art that radio signal strength measurements can be useful in determining which base station should serve a cellular telephone during a call. In the U.S. AMPS system, the mobile telephone would typically use such signal strength measurements to determine the strongest base station to which it should listen for calls during standby (idle) mode. This determination of which base station to communicate with may be referred to as site scanning as periodically the radiotelephone samples the RSSI from other base station sites. To sample the RSSI from other sites typically involves the radio or telephone switching frequency to the new sites control channel and then switch back to the currently selected site to listen for control channel update messages. When the radio is scanning another site to determine its RSSI level the radio can miss control channel information and when it returns to the selected site. The penalty incurred is that the call may be entered late and information may be missed. Hence there may be a significant penalty paid in scanning off the current control channel to look for a better site.

Site scanning is typically employed because, as described above, mobile radios move through different base station coverage regions. Thus, a low RSSI measurement is typically utilized to initiate site scanning in low signal level environments. This use of RSSI generally requires that each device be calibrated so that the RSSI threshold levels are consistent from device to device.

In light of the above discussion, improvements are needed in radiotelephone site scanning so that only a minimum amount of time is spent away from the current control channel frequency and calibration between radios is not required for site scanning purposes.

SUMMARY OF THE INVENTION

It is, therefore, an object of the present invention to provide improved site scanning performance in land mobile radios and/or cellular telephones.

These objects are provided according to the present invention by controlling site scanning of a wireless device by adjusting the rate at which the wireless device scans adjacent sites based on whether the wireless device is in motion. Furthermore, mobile velocity determination may be made by estimating a fade rate and then basing the rate of site scanning on this estimated fade rate. The rate at which the wireless device site scans is related to the estimated fade rate. Fade rate is the rate at which a wireless device's signal level goes through a deep fade in signal strength (for example, a deep fade may occur where the signal level drops below −120 dBm) resulting in audible clicks for analog voice or resulting in bit error bursts when sending digital information. These audible clicks or bit error bursts result even in strong signal environments when severe multi-path fading is present. The fade rate (or level crossing rate) that is estimated is proportional to the velocity of the device, the frequency of the transmitted signal and the threshold value used.

Thus, the present invention may reduce the time away from the currently selected sites control channel by using a very low rate of scanning when the mobile is stationary and increasing the scan rate as the velocity of the mobile increases, i e. adaptively controlling the site scanning. By adjusting the site scanning rate of a wireless device based on an estimate of level crossing or fade rate the site scanning can be tailored to both the motion of the terminal and the signal strength seen by the terminal. For a given threshold and velocity the level crossing rate will decrease as the signal level increases. If the device is moving quickly, the site scanning rate may be increased. If the device is moving slowly, the site scanning rate may be decreased. If the device is not moving, then site scanning may be kept to a very low value. If the velocity of the terminal is slow and the signal level is getting lower, then the site scanning rate will increase because the level crossing rate is preferably dependent on the signal level for a fixed threshold.

Preferably, the site scanning rate is established based on an estimate of fade rate of a received signal. Such a fade rate may be used because, typically, the fade rate is proportional to the velocity of the device. Thus, wireless devices may only need minor software modifications to allow for the adaptive site scanning techniques of the present invention. Furthermore, the determination of fade rate may be carried out without disturbing the normal operation of the device. This adaptive site scanning rate may be used to reduce the time that the device is away from a control channel as well as reduce power drain by eliminating unnecessary operations when the device is in standby mode. Also, in an embodiment based on fade rate, because fade rate increases with decreased signal strength (the level of noise at the discriminator output increases as signal level decreases), the present invention allows for changes in site scanning rates without requiring calibrated RSSI measurements. Thus, the calibration of devices to obtain similar RSSI thresholds may be avoided, i.e. relative RSSI measured in each radio is still used to select the best site but no absolute reference between radios needs to be used to turn on the site scanning function at a calibrated signal level.

In a further embodiment of the present invention, the rate at which the wireless device site scans may be set to a first rate if the fade rate is greater than a first fade rate threshold value. The rate at which the wireless device site scans is set to a second rate, less than the first rate, if the fade rate is less than the first fade rate threshold value. Furthermore, the rate at which the wireless device site scans may be set to a third rate, less than the second rate, if the fade rate is less than a second fade rate threshold value. In such a case, the rate at which the wireless device site scans is set to a second rate, less than the first rate, if the fade rate is less than the first fade rate threshold value and greater than the second fade rate threshold value.

In a particular embodiment of the present invention for an 800 MHz land mobile radio system, the first fade rate threshold value is about 25 fades/s and the second fade rate threshold value about 5 fades/s. If the fade rate exceeds the first fade rate threshold the radio scans a site every 250 ms if the fade rate is between 25 and 5 fades per second the radio scans a site every second. If the fade rate is less 5 fades per second the radio scans a site every 4 seconds In yet another embodiment of the present invention, the fade rate is determined by high pass filtering a received signal to provide a filtered output. The fade rate is estimated by thresholding the filtered signal and counting the threshold exceedances that occur in a fixed time interval. Only the positive thresholds are typically counted because of the sidelobes induced by the high pass filtering.

In a particular embodiment of the present invention, the wireless device is a radiotelephone.

As will be appreciated by those of skill in the art, the present invention may be embodied as methods or systems.

DETAILED DESCRIPTION OF ILLUSTRATED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by one of skill in the art, the present invention may be embodied as methods or devices. Accordingly, the present invention may take the form of an entirely hardware embodiment, an entirely software embodiment or an embodiment combining software and hardware aspects.

Figure 1:
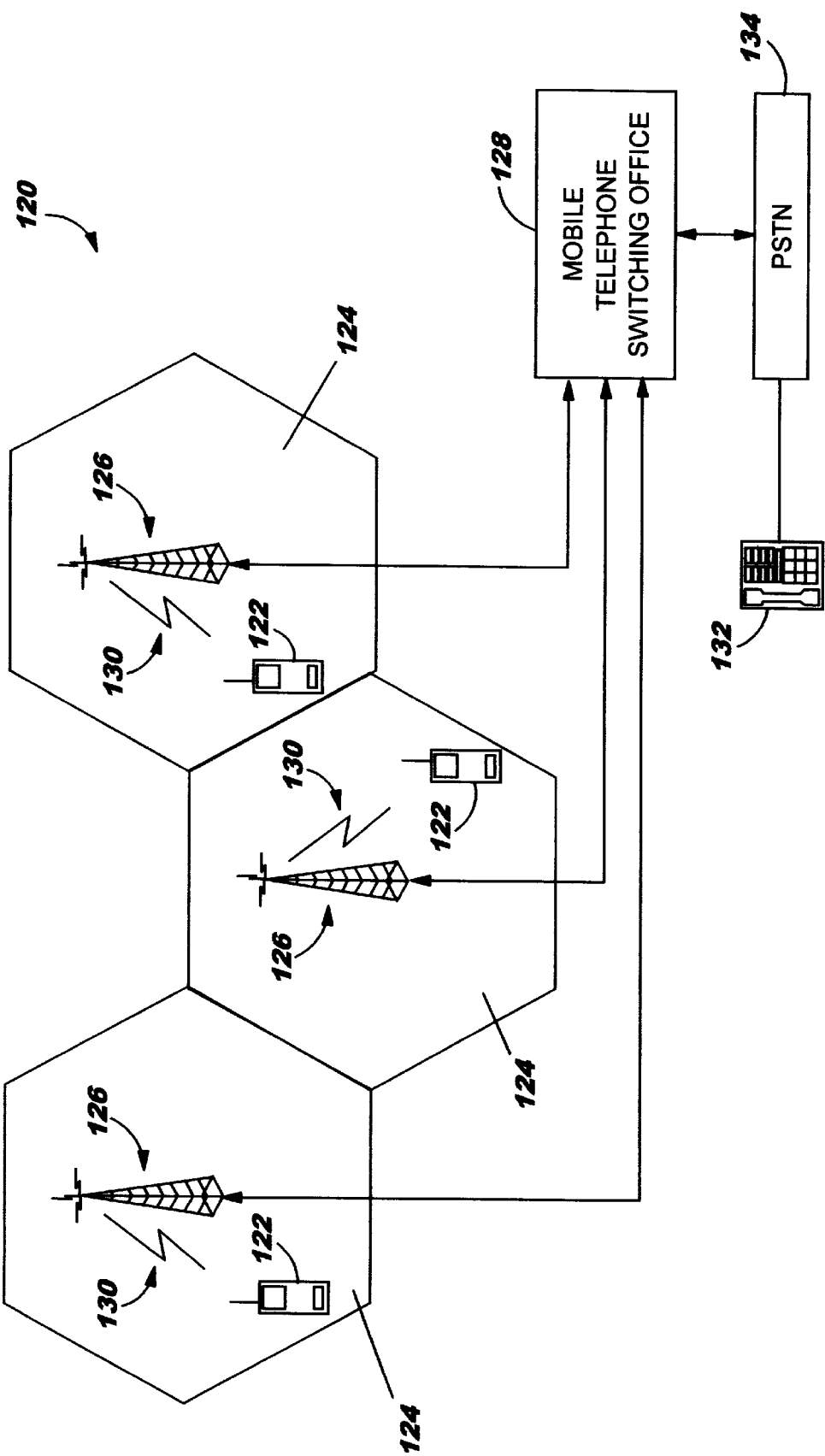
FIG. 1 is a block diagram of a cellular communication system.

FIG. 1 illustrates a conventional terrestrial wireless communication system 120 that may implement one of the aforementioned wireless communication standards. The wireless system may include one or more wireless mobile terminals 122 that communicate within a plurality of cells 124 served by base stations 126 and a mobile telephone switching office (MTSO) 128. Although only three cells 124 are shown in FIG. 1, a typical cellular radiotelephone network may comprise hundreds of cells, and may include more than one MTSO 128 and may serve thousands of wireless mobile terminals 122.

The cells 124 generally serve as nodes in the communication system 120, from which links are established between wireless mobile terminals 122 and a MTSO 128, by way of the base stations 126 servicing the cells 124. Each cell 124 will have allocated to it one or more dedicated control channels and one or more traffic channels. The control channel is a dedicated channel used for transmitting cell identification and paging information. The traffic channels carry the voice and data information. Through the communication system 120, a duplex radio communication link 130 may be effected between two wireless mobile terminals 122 or between a wireless mobile terminal 122 and a landline telephone user 132 via a public switched telephone network (PSTN) 134. The function of the base station 126 is commonly to handle the radio communications within the cell 124 to and from the wireless mobile terminal 122. In this capacity, the base station 126 functions chiefly as a relay station for data and voice signals.

Figure 2:
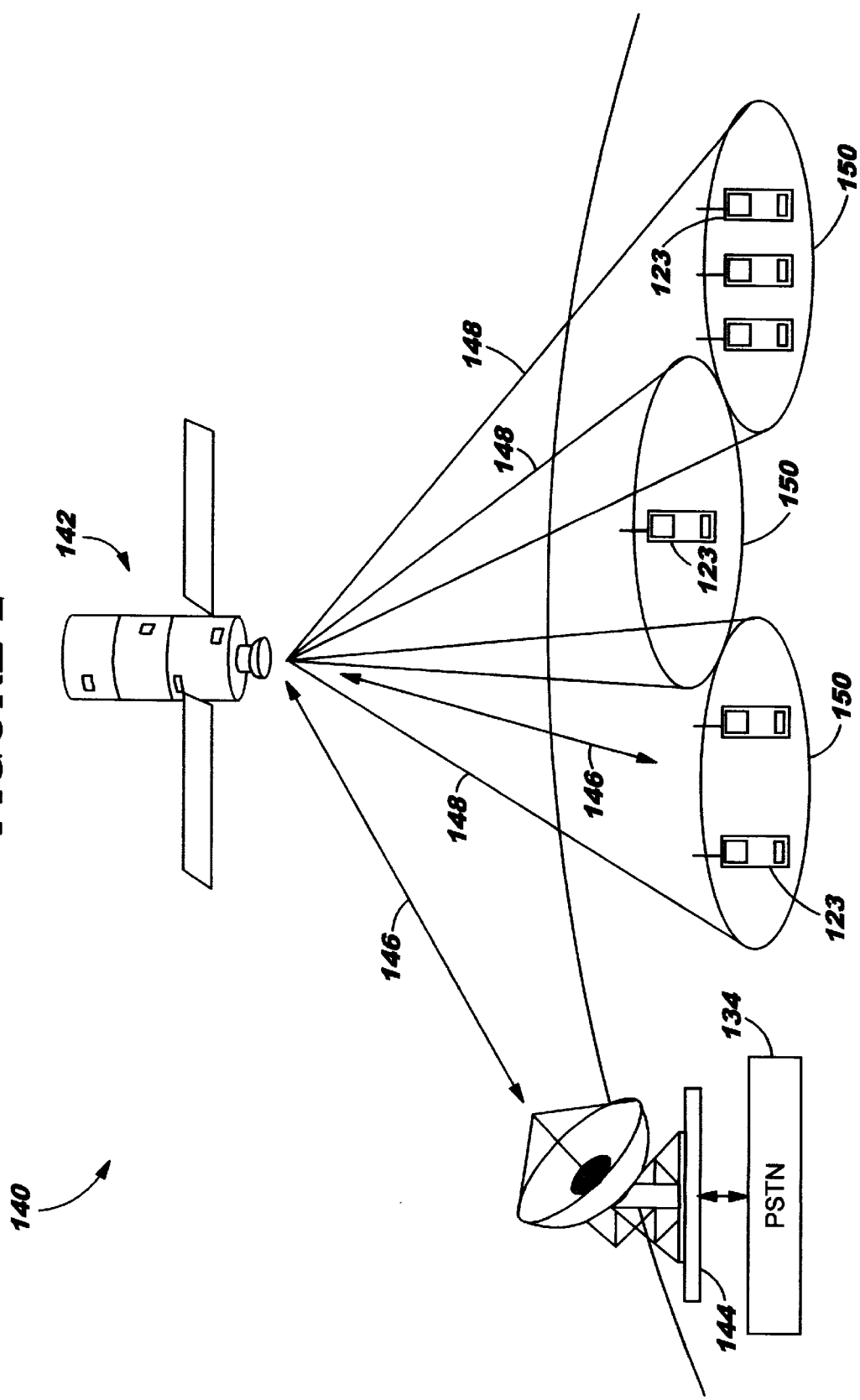
FIG. 2 is a block diagram of a satellite communication system.

FIG. 2 illustrates a conventional celestial (satellite) wireless communication system 140. The celestial wireless communication system 140 may be employed to perform similar functions to those performed by the conventional terrestrial wireless communication system 120 of FIG. 1. In particular, the celestial wireless communication system 140 typically includes one or more satellites 142 that serve as relays or transponders between one or more earth stations 144 and satellite wireless mobile terminals 123. The satellite 142 communicates with the satellite wireless mobile terminals 123 and earth stations 144 via duplex communication links 146. Each earth station 144 may in turn be connected to a PSTN 134, allowing communications between the wireless mobile terminals 123 and conventional landline telephones 132 (FIG. 1).

The celestial wireless communication system 140 may utilize a single antenna beam covering the entire area served by the system, or as shown in FIG. 2, the celestial wireless communication system 140 may be designed such that it produces multiple, minimally-overlapping beams 148, each serving a distinct geographical coverage area 150 within the system's service region. A satellite 142 and coverage area 150 serve a function similar to that of a base station 126 and cell 124, respectively, of the terrestrial wireless communication system 120.

Thus, the celestial wireless communication system 140 may be employed to perform similar functions to those performed by conventional terrestrial wireless communication systems. In particular, a celestial radiotelephone communication system 140 has particular application in areas where the population is sparsely distributed over a large geographic area or where rugged topography tends to make conventional landline telephone or terrestrial wireless infrastructure technically or economically impractical.

In both terrestrial and satellite based communication systems, it is known that a mobile terminal typically must select a new base station 126 when it enters a new cell 124 or a new satellite coverage area 150 (i.e. a beam) as the wireless device moves. As described above, this selection process typically utilizes site scanning to determine if a new base station or beam should be utilized. However, site scanning is typically independent of the status of the mobile radiotelephone as to whether the mobile radiotelephone is in motion. Therefore, site scanning may still occur even if the mobile radiotelephone is not in motion, thus making it unlikely to move between cellular cells or satellite beam. Thus, if the radiotelephone is not in motion it will typically not need to change base stations. Such unneeded site scanning may be detrimental to the performance of the radiotelephone as it typically requires time away from the control channel. Furthermore, if the radiotelephone is in standby mode, power may be unnecessarily utilized by site scanning, thus, shortening the battery life of the radiotelephone. As described below, the present invention addresses these problems by adjusting site scanning rates based on the motion of the radiotelephone.

Figure 3:
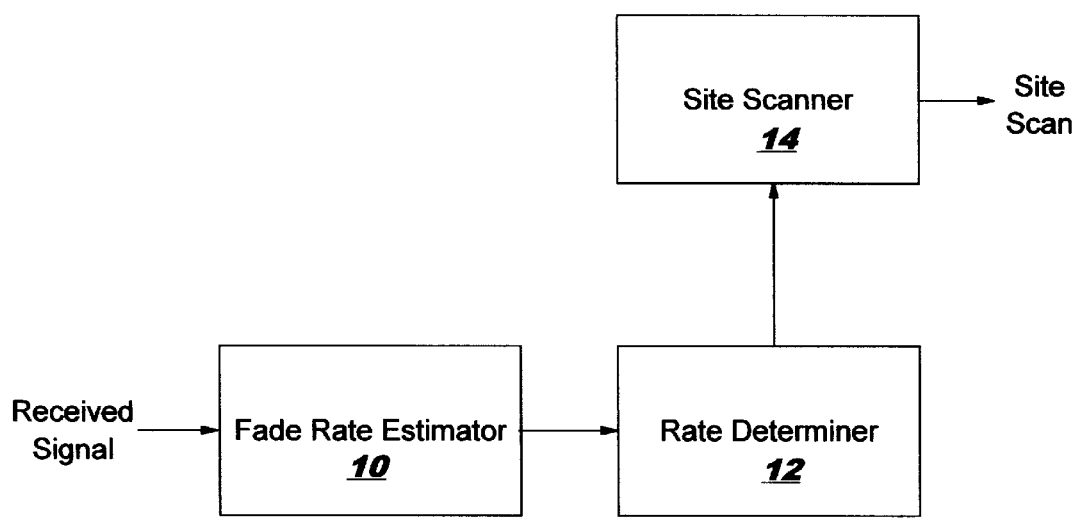
FIG. 3 is a block diagram illustrating an apparatus according to one embodiment of the present invention.

FIG. 3 illustrates one embodiment of an adaptive site scanning system in an FM-based mobile device such as an AMPS cellular telephone according to the present invention. As seen in FIG. 3, a received signal is provided to a fade rate estimator 10. The fade rate estimator 10 receives the signal and determines the fade rate of the signal. The fade rate of the signal provides an estimate of the motion of the device utilizing the present invention. As the velocity, v, or signal frequency ($f=c/\lambda$) increases, the fade rate will increase also. This relationship is shown below in equation (1)

$$Lc = \sqrt{2\pi} f_m \rho \exp(-\rho^2) \quad (1)$$

where $f_m$=doppler frequency $=v/\lambda=vf/c$ and p1 $\rho=R/R_{rms}$=normalized threshold level Fade rate may be determined by band pass or high pass filtering the received signal. The filtered signal is then evaluated to determine the presence of clicks (a click is defined as a short time threshold exceedance, since no sound would typically be heard in a digital data call) in the filtered signal. The determination of the presence of a click may be performed in either analog or digital fashion and in either the time or the frequency domain.

The discriminator converts the frequency modulated signal back to baseband information by performing a derivative function on the phase of the received signal. When a fade occurs or large amounts of noise is present compared to the signal level, the phase can wrap around and a large rate of phase change can occur, thus producing a click which would be audible in an analog call or a spike that would cause bit errors, in a digital call. After the output from the discriminator is filtered, data samples that exceed a predefined threshold value may be counted for a predetermined time period to estimate the fade rate.

Clicks look similar to delta functions in the time domain and hence have energy over all frequencies. Accordingly, high pass filters having a lower 3 dB cutoff frequency of about one-half the baud rate may be utilized to isolate the clicks from the informational portion of the received signal. Similarly, threshold values just above of the maximum deviation level sent by the transmitting radio may be used to determine the presence of a click. Of course it should be clear to those skilled in the art that this technique can be adapted to different modulation methods and receiver architectures.

Fades are generated by the device moving through the various regions of a cell. For example, moving across nodes of the cell may generate a click. The rate at which these clicks are received is typically proportional to the velocity of the device. Thus, the higher the fade rate the more likely that the device will move between cells of a cellular system, and, therefore, the site scanning is preferably performed more often. Similarly, the lower the fade rate the less likely that the device will move between cells before the next site scan and, therefore, the site scanning rate may be reduced. Because the click is independent of the underlying informational content of the received signal, the fade rate may be determined during receipt of the control channel or other conventional wireless communication signals. Thus, the determination of the fade rate may be performed passively in the background and need not alter the normal operation of the wireless device, such as a cellular telephone.

Figure 6:
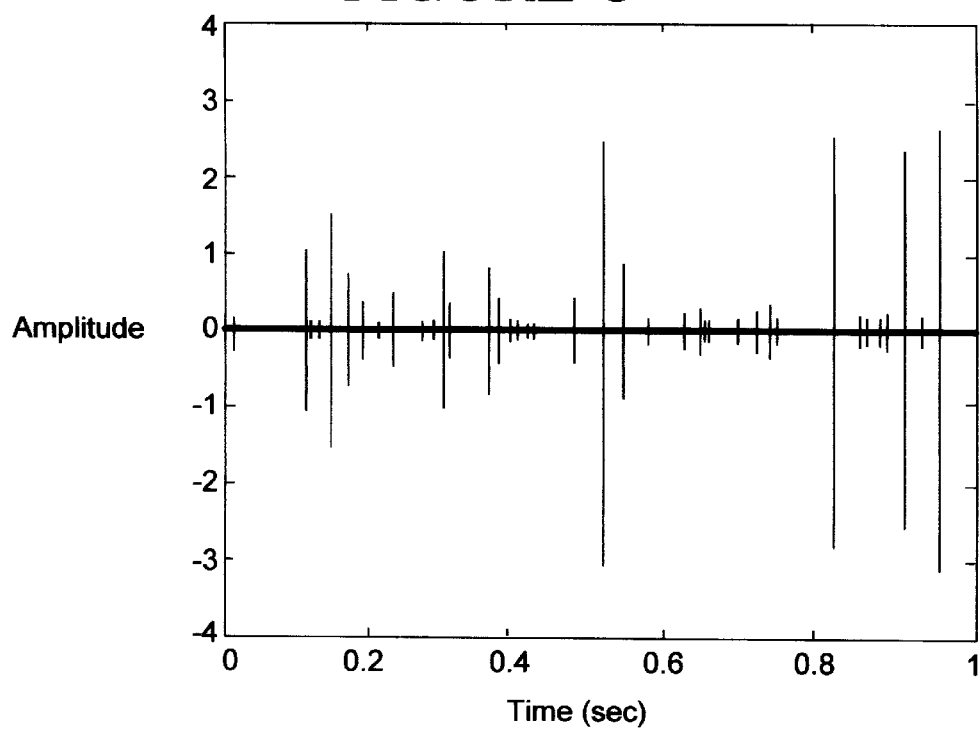
FIG. 6 is a graph of signal amplitude for a weak signal strength condition.
Figure 7:
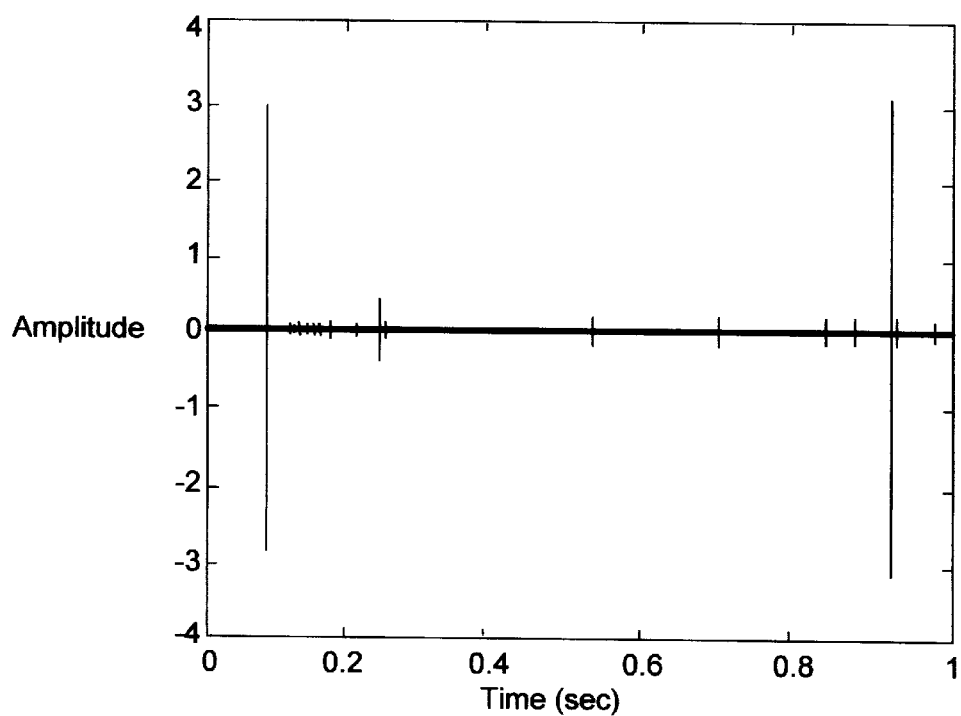
FIG. 7 is a graph of signal detection for a strong signal strength condition.

Furthermore, fade rate typically increases in weak signal conditions. This increase in fade rate results from the higher level of noise present at the radio receiver output and the fact that the threshold remains fixed, based on the deviation level of the transmitting radio. This effect is shown graphically in FIG. 6 and FIG. 7. According to the present invention, the rate of site rate scanning would, therefore, increase in weak signal conditions as well as when the cellular telephone was moving. Thus, the need to utilize an RSSI threshold to determine when to site scan may be avoided because the present invention automatically provides increased site scanning without utilizing the RSSI threshold. Accordingly, individual radios do not need RSSI calibration to accomplish increased site scanning in reduced signal strength environments.

Returning to FIG. 3, the fade rate estimator 10 provided the fade rate to the rate determiner 12. The rate determiner uses the fade rate to determine the rate at which site scanning will occur. This determination may be made by evaluating the fade rate as compared to one or more thresholds. The thresholds may then be used to select a predefined rate at which site scanning will occur. Such a system may use, for example, a look-up table using the fade rate as an index into the look-up table to select a site scanning rate. An example of such a look-up table is illustrated in Table 1 below.

TABLE 1

Fade rate versus Scan Rate for 800 MHz System

| Fade Rate Estimate | Scan Rate |
| --- | --- |
| Less that 5 fades/sec | .25 Hz |
| Less than 25 fades/sec and greater than 10 fades/sec | 1 Hz |
| Greater than 25 fades/sec | 2.5 Hz |

Alternatively, the fade rate may be used directly in a scan rate control equation that would provide the scan rate based on the fade rate. In either implementation the site scan rate is proportional to the fade rate.

The scan rate is provided to the site scanner 14 which scans for alternative sites at the scan rate established by the rate determiner 12. Each individual site scan may be carried out using conventional site scanning techniques as would be understood by those of skill in this art. However, the rate at which the site scans occur may be set based on the fade rate.

As an example of the benefits of the present invention, if a cellular telephone is in standby mode but is not in motion, the site scanning operations may be eliminated as it would be unlikely that the cellular telephone would move between cells. Thus, by eliminating the site scanning operations, the battery life of the telephone may be increased. Furthermore, even when the cellular telephone is in motion, by reducing the rate at which site scanning occurs, the time the cellular telephone is not receiving and processing the control channel may be reduced. Thus, the efficiency of operation of the cellular telephone may be increased.

Figure 4:
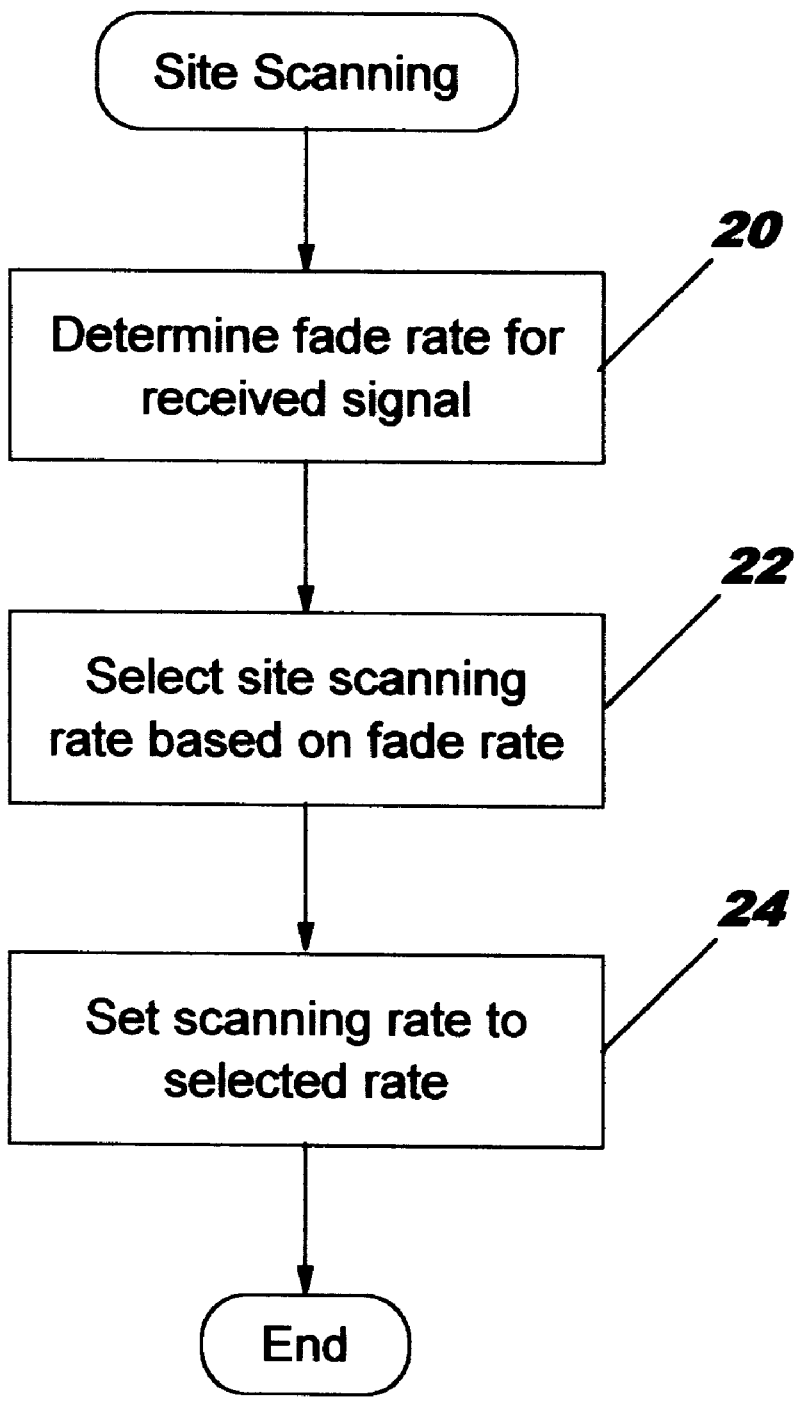
FIG. 4 is a flowchart illustrating operations according to an embodiment of the present invention.

FIG. 4 illustrates the operations of the present invention. As seen in FIG. 4, the site scanning operation begins by determining the fade rate for the received signal (block 20). This fade rate is then used to select the site scanning rate as discussed above (block 22). Site scanning then commences at the selected rate (block 24).

Figure 5:
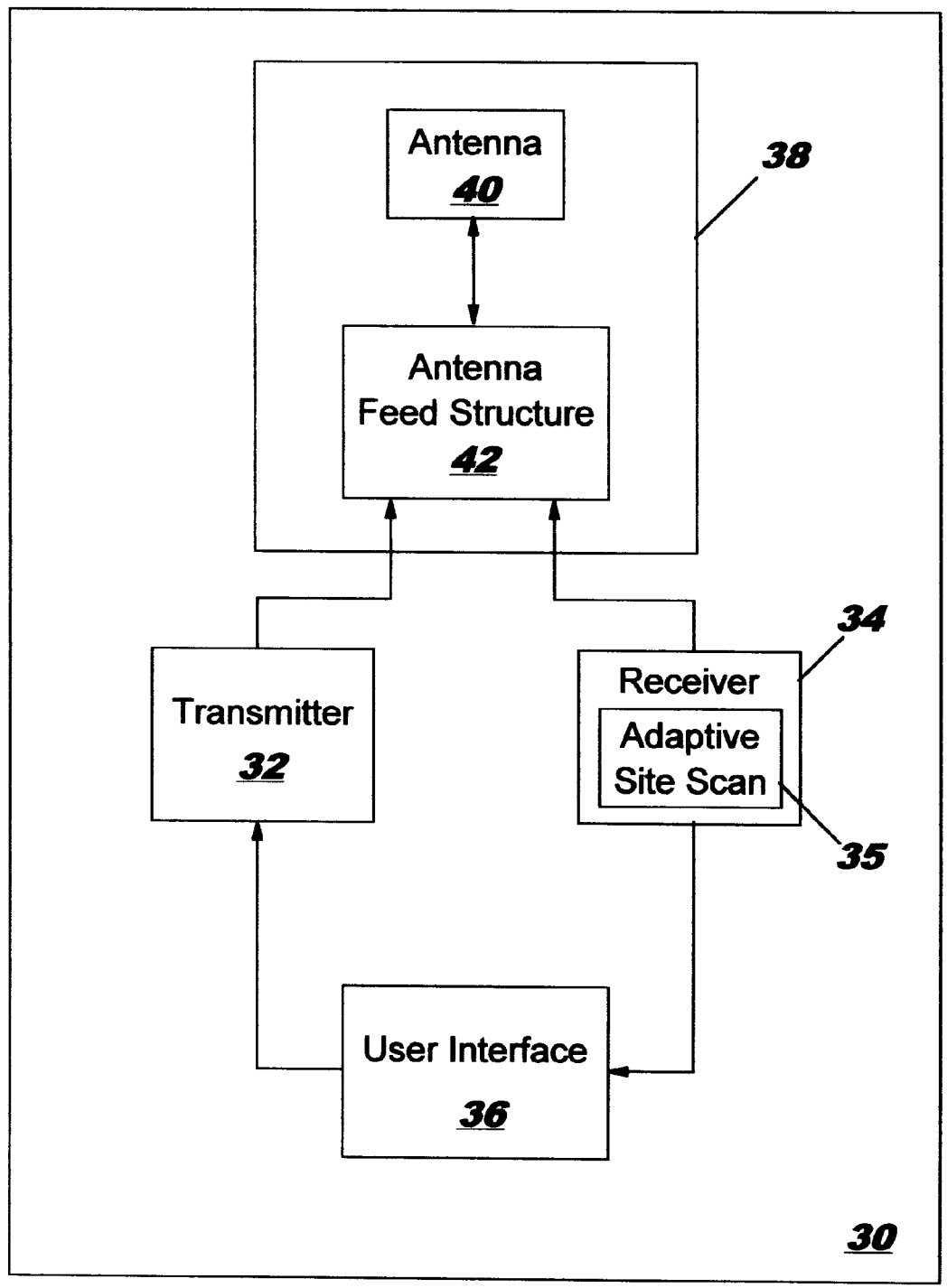
FIG. 5 is a block diagram of a radiotelephone according to an embodiment of the present invention.

An embodiment of a radiotelephone 30 which includes an adaptive site scanning system 35 according to the present invention is depicted in the block diagram of FIG. 5. As shown in FIG. 5, radiotelephone 30 typically includes a transmitter 32, a receiver 34, a user interface 36 and an antenna system 38. The antenna system 38 may include an antenna feed structure 42 and an antenna 40. As is well known to those of skill in the art, transmitter 32 converts the information which is to be transmitted by radiotelephone 30 into an electromagnetic signal suitable for radio communications. Receiver 34 demodulates electromagnetic signals which are received by radiotelephone 30 so as to provide the information contained in the signals to user interface 36 in a format which is understandable to the user. A wide variety of transmitters 32, receivers 34, user interfaces 36 (e.g., microphones, keypads, rotary dials) which are suitable for use with handheld radiotelephones are known to those of skill in the art, and such devices may be implemented in radiotelephone 30. The design of radiotelephone 30 other than the adaptive site scanning system 35 is well known to those of skill in the art and will not be further described herein.

As is illustrated in FIG. 5, the adaptive site scanning rate system 15 of the present invention may be incorporated in the receiver of the radiotelephone 30. However, as will be appreciated by those of skill in the art, as the present invention relates to the control of the receiver, the adaptive site scanning system may be incorporated in any number of existing components of the radiotelephone or into a new component. For example, the present invention may be incorporated into a control processor of the radiotelephone which controls the operations of the receiver. Alternatively, a system according to the present invention could directly control the receiver scan rate. Thus, the present invention should not be limited to the embodiments described herein.

As will be appreciated by those of skill in the art, the above described aspects of the present invention in FIGS. 3, 4 and 5 may be provided by hardware, software, or a combination of the above. While the various components of the systems of the present invention have been illustrated in part as discrete elements in FIGS. 3 and 5, they may, in practice, be implemented by a microcontroller including input and output ports and running software code, by custom or hybrid chips, by discrete components or by a combination of the above.

The present invention has been described above with respect to FIG. 4 with reference to flowcharts illustrating the operation of the present invention. It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based systems which perform the specified functions or steps, or combinations of special purpose hardware and computer instructions.

The present invention has also been described with respect to a cellular telephone or radiotelephone. However, as will be appreciated by those of skill in the art, the teachings of the present invention are applicable to any wireless communication device which receives clicks. Thus, for example, the present invention may be embodied as a wireless personal data assistant or as a satellite communication device as illustrated in FIG. 2.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of controlling site scanning of a wireless device comprising:
   adjusting a rate at which the wireless device site scans based on whether the wireless device is in motion, wherein said step of adjusting a rate at which the wireless device site scans comprises the steps of:
   determining a fade rate associated with the wireless device; and
   adjusting the rate at which the wireless device site scans based on the fade rate associated with the wireless device; and
   wherein the step of determining a fade rate comprises the steps of:
   high pass filtering a received signal to provide a filtered output; and
   counting fade occurrences in the filtered output by counting a fade occurrence if the amplitude of the filtered output is above a predefined threshold, the predefined threshold being based on a maximum deviation level sent by a transmitting device.

2. A method according to claim 1, wherein the step of adjusting the rate comprises the steps of:
   setting the rate at which the wireless device site scans to a first rate if the fade rate is greater than a first fade rate threshold value; and
   setting the rate at which the wireless device site scans to a second rate, less than the first rate, if the fade rate is less than the first fade rate threshold value.

3. A method according to claim 2, further comprising the step of setting the rate at which the wireless device site scans to a third rate, less than the second rate, if the fade rate is less than a second fade rate threshold value; and
   wherein the step of setting the rate at which the wireless device site scans to a second rate, less than the first rate, if the fade rate is less than the first fade rate threshold value comprises the step of setting the rate at which the wireless device site scans to a second rate, less than the first rate, if the fade rate is less than the first fade rate threshold value and greater than the second fade rate threshold value.

4. A method according to claim 2, wherein the first fade rate threshold value is from about 5 to about 10 clicks/s.

5. A method according to claim 3, wherein the first fade rate threshold value is from about 5 to about 10 clicks/s and wherein the second fade rate threshold value is from about 25 to about 50 clicks/s for an 800 MHz land mobile communication system.

6. A method according to claim 1, wherein the step of adjusting the rate comprises adjusting the rate at which the wireless device site scans proportionally to the fade rate.

7. A method according to claim 1, wherein the wireless device is a radiotelephone.

8. A system for controlling site scanning of a wireless device comprising:
   means for determining if the wireless device is in motion; and
   means for adjusting a rate at which the wireless device site scans based on whether the wireless device is in motion;
      wherein said means for determining if the wireless device is in motion comprises means for determining a fade rate associated with the wireless device;
      wherein said means for adjusting a rate at which the wireless device site scans comprises means for adjusting the rate at which the wireless device site scans based on the fade rate associated with the wireless device; and
      wherein the means for determining the fade rate comprises:
         means for high pass filtering a received signal to provide a filtered output; and
         means for counting fade occurrences in the filtered output by counting a fade occurrence if the amplitude of the filtered output is above a predefined threshold, the predefined threshold being based on a maximum deviation level sent by a transmitting device.

9. A system according to claim 8, wherein the means for adjusting the rate comprises:
   means for setting the rate at which the wireless device site scans to a first rate if the fade rate is greater than a first fade rate threshold value; and
   means for setting the rate at which the wireless device site scans to a second rate, less than the first rate, if the fade rate is less than the first fade rate threshold value.

10. A system according to claim 9, further comprising means for setting the rate at which the wireless device site scans to a third rate, less than the second rate, if the fade rate is less than a second fade rate threshold value; and
   wherein the means for setting the rate at which the wireless device site scans to a second rate, less than the first rate, if the fade rate is less than the first fade rate threshold value comprises means for setting the rate at which the wireless device site scans to a second rate, less than the first rate, if the fade rate is less than the first fade rate threshold value and greater than the second fade rate threshold value.

11. A system according to claim 9, wherein the first fade rate threshold value is from about 5 to about 10 clicks/s.

12. A system according to claim 10, wherein the first fade rate threshold value is from about 5 to about 10 clicks/s and wherein the second fade rate threshold value is from about 25 to about 50 clicks/s.

13. A system according to claim 8, wherein the means for adjusting the rate comprises means for adjusting the rate at which the wireless device site scans proportionally to the fade rate.

14. A system according to claim 8, wherein the wireless device is a radiotelephone.

* * * * *